United States Patent
Ichikawa et al.

(10) Patent No.: US 7,056,568 B2
(45) Date of Patent: Jun. 6, 2006

(54) HONEYCOMB STRUCTURE AND PROCESS FOR PRODUCTION THEREOF

(75) Inventors: Shuichi Ichikawa, Handa (JP); Naoshi Masukawa, Nishikasugai-gun (JP)

(73) Assignee: NGK Insulators, Ltd., Nagoya (JP)

( * ) Notice: Subject to any disclaimer, the term of this patent is extended or adjusted under 35 U.S.C. 154(b) by 286 days.

(21) Appl. No.: 10/467,455

(22) PCT Filed: Nov. 15, 2002

(86) PCT No.: PCT/JP02/11903

§ 371 (c)(1),
(2), (4) Date: Aug. 7, 2003

(87) PCT Pub. No.: WO03/044338

PCT Pub. Date: May 30, 2003

(65) Prior Publication Data

US 2004/0097370 A1    May 20, 2004

(30) Foreign Application Priority Data

Nov. 20, 2001   (JP)   ............................ 2001-353976

(51) Int. Cl.
B32B 3/12    (2006.01)

(52) U.S. Cl. .................. 428/116; 428/117; 428/118; 428/34.4; 428/188

(58) Field of Classification Search ........ 428/116–118, 428/34.4, 188
See application file for complete search history.

(56) References Cited

U.S. PATENT DOCUMENTS

| 4,335,783 A | 6/1982 | McBrayer et al. |
| 4,669,261 A * | 6/1987 | Worner et al. ................. 60/297 |
| 6,596,666 B1 * | 7/2003 | Yamada ....................... 502/327 |
| 2004/0093858 A1 * | 5/2004 | Aoki ............................ 60/299 |

FOREIGN PATENT DOCUMENTS

| JP | 61-51240 | 11/1986 |
| JP | 8-28246 | 1/1996 |
| JP | 2001-162119 | 6/2001 |
| JP | A 2001-190917 | 7/2001 |
| JP | A 2002-273137 | 9/2002 |
| WO | WO 01/51173 A | 7/2001 |

OTHER PUBLICATIONS

S. Gulati, "Strength and Thermal Shock Resistance of Segmented Wall-Flow Diesel Filters," *SAE Article*, pp. 11-18, 1986.

* cited by examiner

Primary Examiner—Ling Xu
(74) Attorney, Agent, or Firm—Oliff & Berridge, PLC (57) ABSTRACT

A honeycomb structure, and a process for production thereof, formed by bonding into one piece via a bonding layer a plurality of honeycomb segments, the honeycomb segment having an outer wall, partition walls provided inside the outer wall, and a large number of through-holes divided by the partition walls and extending in the axial direction of the segment; the outer wall and bonding layer having a relation:

$$d^*[(\kappa a/da)+(\kappa c/dc)] \geq \kappa \geq d^*[(\kappa a/da)+(\kappa c/dc)] \times 0.6$$

wherein $\kappa c$ (W/mK) and $dc$ (cm) are respectively the thermal conductivity and thickness of the outer wall, $\kappa a$ (W/mK) and $da$ (cm) are respectively the thermal conductivity and thickness of the bonding layer, and $\kappa$ (W/mK) and $d$ (cm) are respectively the thermal conductivity and thickness of a layer which is the sum of the outer wall and the bonding layer.

19 Claims, 5 Drawing Sheets

HONEYCOMB STRUCTURE AND PROCESS FOR PRODUCTION THEREOF

TECHNICAL FIELD

The present invention relates to a honeycomb structure used in, for example, a filter for capturing fine particles present in an exhaust gas emitted from an internal combustion engine, a boiler or the like, particularly to a honeycomb structure of superior durability; as well as to a process for production thereof.

BACKGROUND ART

Honeycomb structures are in use in, for example, a filter for capturing fine particles present in an exhaust gas emitted from an internal combustion engine, a boiler or the like, particularly diesel fine particles.

Figure 5A:
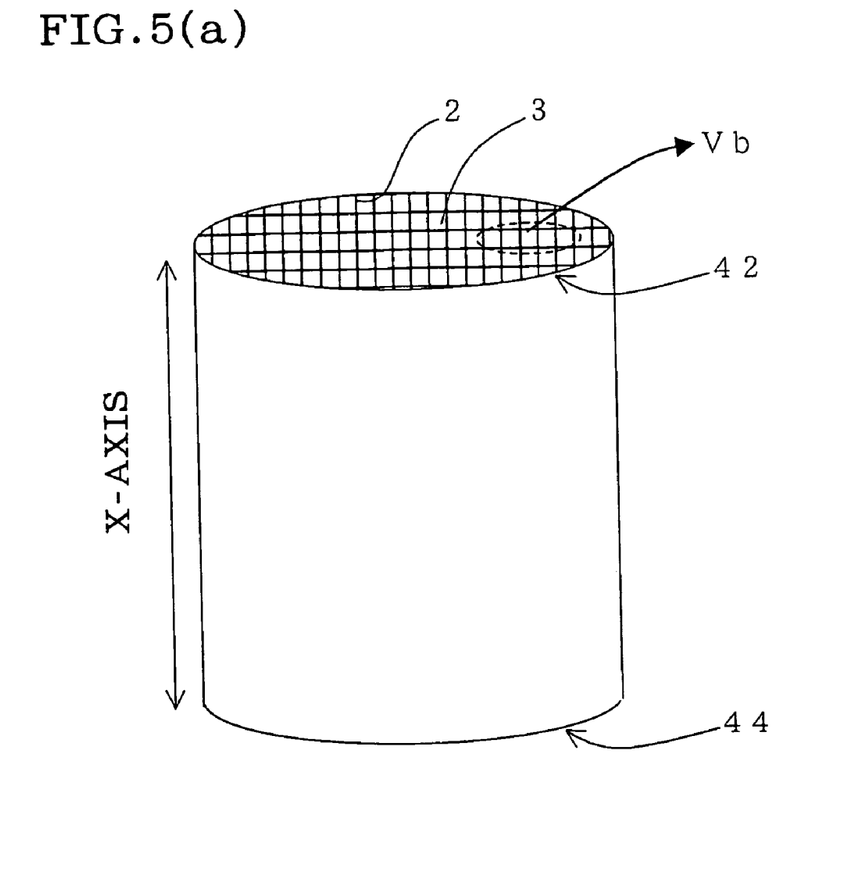
FIG. 5(a) is a schematic perspective view showing a conventional honeycomb structure.
Figure 5B:
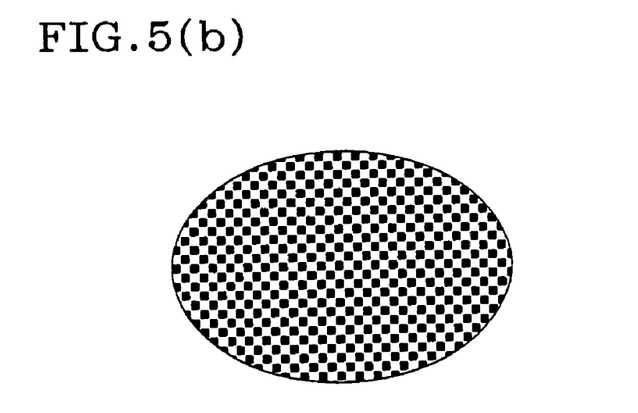
FIG. 5(B) is a schematic enlarged view of the portion Vb of FIG. 5(a).

As shown in FIG. 5(a) and FIG. 5(b), honeycomb structures used for such a purpose have, in general, a large number of through-holes 3 divided by partition walls 2 and extending in an X axis and have such a constitution that each adjacent through-holes 3 are plugged at opposite ends of the structure each other (plugged alternately) so that each end face looks checkerboard pattern. In a honeycomb structure having such a structure, a fluid to be treated enters those through-holes 3 not plugged at the inlet side end face 42, that is, those through-holes 3 plugged at the outlet side end face 44, passes through porous partition walls 2, and is discharged from adjacent through-holes 3, that is, those through-holes plugged at the inlet side end face 42 but not plugged at the outlet side end face 44. In this case, the partition walls 2 become filters and, for example, soot emitted from a diesel engine is captured by the partition walls and deposited thereon. In a honeycomb structure used in such a way, the sharp temperature change of exhaust gas and the local heating of the structure make non-uniform the temperature distribution inside the structure and there have been problems such as crack generation in honeycomb structure and the like. When the honeycomb structure is used particularly as a filter for capturing a particulate substance in an exhaust gas emitted from a diesel engine (this filter is hereinafter referred to as DPF), it is necessary to burn the carbon particles deposited on the filter to remove the particles and regenerate the filter and, in that case, high temperatures are inevitably generated locally in the filter; as a result, there were problems of a reduction in filter regeneration efficiency due to non-uniformity of regeneration temperature and easy generation of cracks due to large thermal stress. Further, non-uniform temperature distribution during filter regeneration made it difficult for the whole portion of filter to be at an optimum temperature and also made it difficult to achieve a high regeneration efficiency.

Hence, there were proposed processes for producing a honeycomb structure by bonding a plurality of individual segments using an adhesive. In, for example, U.S. Pat. No. 4,335,783 is disclosed a process for producing a honeycomb structure, which comprises bonding a large number of honeycomb parts using a discontinuous adhesive. Also in JP-B-61-51240 is proposed a heat-shock resistant rotary regenerative heat exchanger is formed by extrusion molding a matrix segment of honeycomb structure made of a ceramic material; firing them, making smooth, by processing, the outer peripheral portion of the fired segment; coating the parts to be bonded of the resulting segments with a ceramic adhesive which turns to have substantially the same mineral composition as the matrix segments and showing a difference in thermal expansion coefficient, of 0.1% or less at 800° C., after firing; and firing the coated segments. Also in a SAE article 860008 of 1986 is disclosed a ceramic honeycomb structure obtained by bonding cordierite honeycomb segments with cordierite cement. Further in JP-A-8-28246 is disclosed a ceramic honeycomb structure obtained by bonding honeycomb ceramic members with an elastic sealant made of at least a three-dimensionally intertwined inorganic fiber, an inorganic binder, an organic binder and inorganic particles. Also, it was tried to prevent the local heating of honeycomb structure and its breakage caused by thermal stress, by producing a honeycomb structure using, for example, a silicon carbide-based material of high thermal conductivity and high heat resistance.

By using honeycomb segments and/or using a highly heat-resistant material such as silicon carbide-based material, breakage caused by thermal stress can be prevented to a certain extent; however, the temperature difference between outer peripheral portion and center of honeycomb structure cannot be eliminated and the above approach has been insufficient in uniform regeneration and resultant durability improvement. Further, local heating appeared during regeneration, in some cases.

In JP-A-2001-162119 is disclosed a filter which is a ceramic filter assembly having a sealing layer (a bonding layer) of 0.3 to 5 mm in thickness and 0.1 to 10 W/mk in thermal conductivity, thereby can have a uniform temperature as a whole, and gives little local unburned matter. By keeping the thickness of bonding layer and the thermal conductivity each in a given range, local unburned matter can be made small and an increase in soot regeneration efficiency is made possible; however, the above filter was insufficient in prevention of the generation of temperature gradient and thermal stress when there was heat generation to high temperatures locally, and insufficient in an increase in maximum soot amount enabling soot regeneration.

DISCLOSURE OF THE INVENTION

The present invention has been made in view of the above situation and aims at providing a honeycomb structure which can prevent excessive temperature increase, which is superior in durability, and which, when used particularly as a DPF, is high in maximum soot amount enabling soot regeneration.

The first aspect of the present invention provides a honeycomb structure formed by bonding a plurality of honeycomb segments into one piece, via a bonding layer, the honeycomb segment having an outer wall, partition walls provided inside the outer wall, and a large number of through-holes divided by the partition walls and extending in the axial direction of the segment, characterized by comprising the outer wall and the bonding layer having a relation of $$d*[(\kappa a/da)+(\kappa c/dc)] \geq \kappa \geq d*[(\kappa a/da)+(\kappa c/dc)] \times 0.6$$

wherein κc (W/mK) and dc (cm) are respectively the thermal conductivity and thickness of the outer wall, κa (W/mK) and da (cm) are respectively the thermal conductivity and thickness of the bonding layer formed on the outer wall, and κ (W/mK) and d (cm) are respectively the thermal conductivity and thickness of a layer which is the sum of the outer wall and the bonding layer.

In the first aspect, it is preferred that the outer wall is formed by firing of a raw material containing a particulate substance S, and the bonding layer contains a particulate substance A having an average particle diameter of ¹/₁₀₀ to ½ relative to the average particle diameter of the particulate substance S, and it is more preferred that the bonding layer comprises an intermediate layer containing a particulate substance A having an average particle diameter of ¹/₁₀₀ to ½ relative to the average particle diameter of the particulate substance S and formed directly on the outer wall, and an adhesive layer. Also, in the first aspect, it is preferred that the bonding layer comprises a layer formed from a raw material containing a liquid having a surface tension of 70 dyn/cm or less at 25° C., and it is more preferred that the liquid contained in the raw material of the bonding layer contains water and an organic liquid having, at 25° C., a density of 0.9 to 1.1 g/cm³ and a surface tension smaller than that of water. It is also preferred that the bonding layer contains a ceramic, and that the honeycomb segments contain silicon carbide or a silicon-silicon carbide composite material as a major component. It is also preferred that predetermined through-holes of the honeycomb segment are plugged at one end face of the segment and the remaining through-holes of the segment are plugged at another end face of the segment, and that at least 70% by volume of the structure is constituted by honeycomb segments having a sectional area of 900 to 10,000 mm².

The second aspect of the present invention provides a process for producing a honeycomb structure of the first aspect of the present invention (set forth in any of claims 1 to 9), which comprises a formation step of forming a honeycomb segment having an outer wall, partition walls provided inside the outer wall, and a large number of through-holes divided by the partition walls and extending in the axial direction of the segment, and a bonding step of bonding the honeycomb segments to produce a honeycomb structure, characterized in that the formation step comprises a firing step of firing a raw material containing a particulate substance S, the bonding step comprises a step of applying a bonding agent to form a bonding layer, on the outer wall and a step of bonding the resulting honeycomb segments into one piece, and the bonding agent contains a particulate substance A having an average particle diameter of ¹/₁₀₀ to ½ relative to the average particle diameter of the particulate substance S in the raw material for firing. In the second aspect of the present invention, it is preferred that the step of applying a bonding agent to form a bonding layer comprises a step of applying, on the outer wall of the honeycomb segment, an intermediate layer agent to form at least one intermediate layer and a step of applying an adhesive to form at least one adhesive layer.

The third aspect of the present invention provides a process for producing a honeycomb structure of the first aspect of the present invention (set forth in any of claims 1 to 9), which comprises a formation step of forming a honeycomb segment having an outer wall, partition walls provided inside the outer wall, and a large number of through-holes divided by the partition walls and extending in the axial direction of the segment, and a bonding step of bonding the honeycomb segments to produce a honeycomb structure, characterized in that the bonding step comprises a step of applying a bonding agent to form at least one bonding layer, on the outer wall and a step of bonding the resulting honeycomb segments into one piece, and the bonding agent contains a liquid having a surface tension of 70 dyn/cm or less at 25° C. In the third aspect, it is preferred that the liquid having a surface tension of 70 dyn/cm or less at 25° C. contains water and an organic liquid having, at 25° C., a density of 0.9 to 1.1 g/cm³ and a surface tension smaller than that of water.

BEST MODE FOR CARRYING OUT THE INVENTION

The honeycomb structure and process for production of honeycomb structure according to the present invention are described in detail with reference to the accompanying drawings. However, the present invention is in no way restricted to the following embodiments. In the followings, "section" means a section perpendicular to the direction of through-holes (X-axis direction), unless otherwise specified.

Figure 1A:
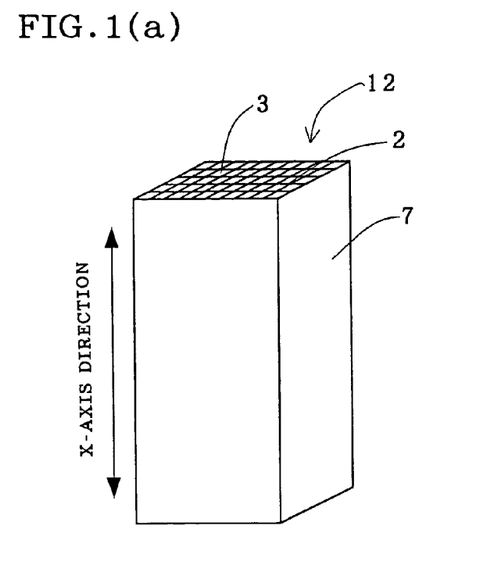
FIG. 1(a) is a schematic perspective view showing an embodiment of the honeycomb segment according to the present invention.
Figure 1B:
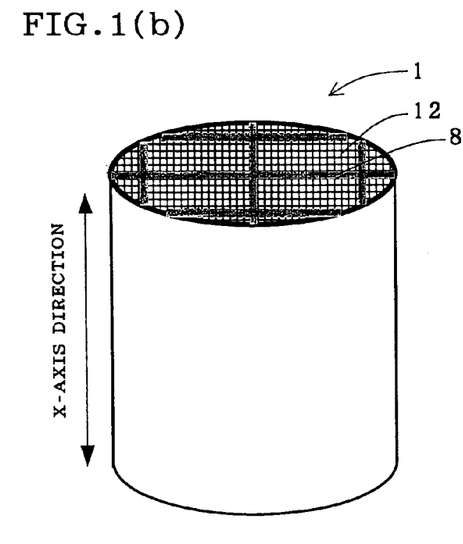
FIG. 1(b) is a schematic perspective view showing an embodiment of the honeycomb structure of the present invention.
Figure 1C:
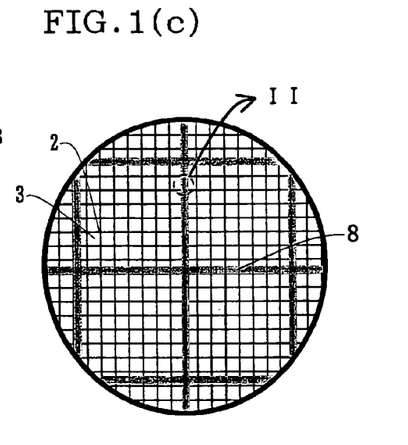
FIG. 1(c) is a schematic plan view showing an embodiment of the honeycomb structure of the present invention.

The honeycomb structure 1 according to the first aspect of the present invention is, as shown in, for example, FIGS. 1(a), 1(b) and 1(c), a honeycomb structure formed by bonding into one piece, via a bonding layer 8, a plurality of honeycomb segments 12. The honeycomb segment has an outer wall 7, partition walls 2 provided inside the outer wall 7, and a large number of through-holes 3 divided by the partition walls 2 and extending in the axial direction of the segment.

Figure 2:
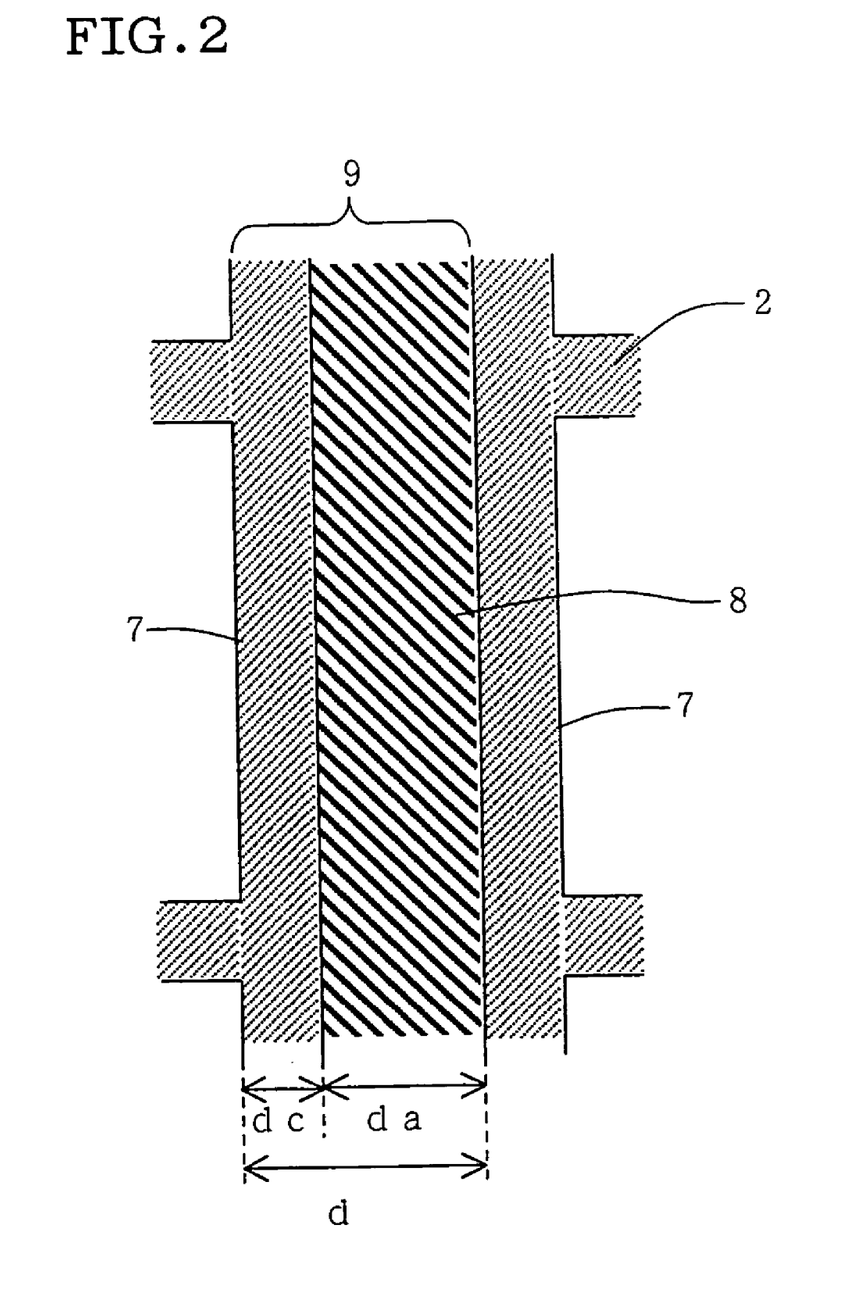
FIG. 2 is a schematic enlarged view of the portion II of FIG. 1(c).

The important characteristic of the first aspect lies in that; the honeycomb structure has the outer wall 7 and the bonding layer 8 having a relation of $$d^*[(\kappa a/da)+(\kappa c/dc)] \geq \kappa \geq d^*[(\kappa a/da)+(\kappa c/dc)] \times 0.6$$

wherein κc (W/mK) and dc (cm) are respectively the thermal conductivity and thickness of the outer wall, κa (W/mK) and da (cm) are respectively the thermal conductivity and thickness of the bonding layer 8 formed on the outer wall 7, and κ (W/mK) and d (cm) are respectively the thermal conductivity and thickness of a layer which is the sum of the outer wall and 7 the bonding layer 8, as shown in, for example, FIG. 2. In the present invention, "thermal conductivity" means a thermal conductivity in a thickness direction.

When the thickness of the outer wall 7 is dc (cm) and the thickness of the bonding layer 8 formed on the outer wall is da (cm), the thickness d (cm) of a layer 9 which is the sum of the outer wall 7 and the bonding layer 8 (the layer is hereinafter referred to as circumferential layer), becomes d=da+dc. Also, when the thermal conductivity of the outer wall 7 is κc (W/mK) and the thermal conductivity of the bonding layer 8 is κa (W/mK), the thermal conductivity κ

(W/mK) of the circumferential layer 9 is represented by the following formula based on the series circuit model.

$$\kappa/d = [(\kappa a/da) + (\kappa c/dc)] \times X \qquad (1)$$

(X=0 to 1)

In the formula (1), X indicates the extent of thermal conduction at interface. X=1 indicates heat conduction at interface without loss of it due to thermal resistance, and X=0 indicates complete cut-off of heat conduction at interface. When X is smaller than 0.6, the thermal resistance at interface is large irrespective of the thermal conductivity of the bonding layer 8; as a result, the temperature distribution inside honeycomb structure is non-uniform, a thermal stress appears, and the honeycomb structure tends to generate cracks. Accordingly, by keeping X at 0.6 or more, preferably 0.8 or more, more preferably 0.9 or more, the thermal conduction between honeycomb segments is smooth and the temperature distribution inside honeycomb structure can be uniformized.

That is, when there is the following relation $$d*[(\kappa a/da)+(\kappa c/dc)] \geq \kappa \geq d*[(\kappa a/da)+(\kappa c/dc)] \times 0.6$$

preferably $$d*[(\kappa a/da)+(\kappa c/dc)] \geq \kappa \geq d*[(\kappa a/da)+(\kappa c/dc)] \times 0.8,$$

more preferably $$d*[(\kappa a/da)+(\kappa c/dc)] \geq \kappa \geq d*[(\kappa a/da)+(\kappa c/dc)] \times 0.9,$$

the temperature distribution inside honeycomb structure can be uniformized.

It is necessary for the honeycomb structure according to the first aspect of the present invention to have the outer wall and the bonding layer satisfying the above formula. In this case, it is preferred that the bonding layer and each outer wall present at the both sides of the bonding layer satisfy the above formula. In the first aspect, it is also preferred that 50% by volume or more, preferably 70% by volume or more, more preferably 90% by volume or more of the outer wall of the honeycomb segment having a bonding layer thereon satisfies the above formula together with the bonding layer. Most preferably, the total outer wall satisfies the above formula together with the bonding layer formed on the outer wall.

In a preferred embodiment for satisfying the above formula, that is, for reducing the thermal resistance at the interface between outer wall and bonding layer, there is used, for example, a constitution in which the outer wall is formed by firing of a raw material containing a particulate substance S and the bonding layer contains a particulate substance A having an average particle diameter of ¹⁄₁₀₀ to ½ relative to the average particle diameter of the particulate substance S. When the outer wall is formed by firing of a raw material containing the particulate substance S, there generally appear open pores and surface unevenness at the surface of the outer wall; in this case, since the bonding layer contains a particulate substance A having an average particle diameter smaller than the average particle diameter of the particulate substance S which is a raw material of the outer wall, the particulate substance gets into the open pores and concave portions at the outer wall surface, the adhesivity between intermediate layer and outer wall is improved owing to an anchor effect, and the thermal resistance at the interface can be decreased. The particulate substance A shows no anchor effect when it is too large or too small, and the average particle diameter of the particulate substance A is preferably ¹⁄₁₀₀ to ½, more preferably ¹⁄₇₅ to ⅕, most preferably ¹⁄₅₀ to ¹⁄₁₀ of that of the particulate substance S.

Figure 3:
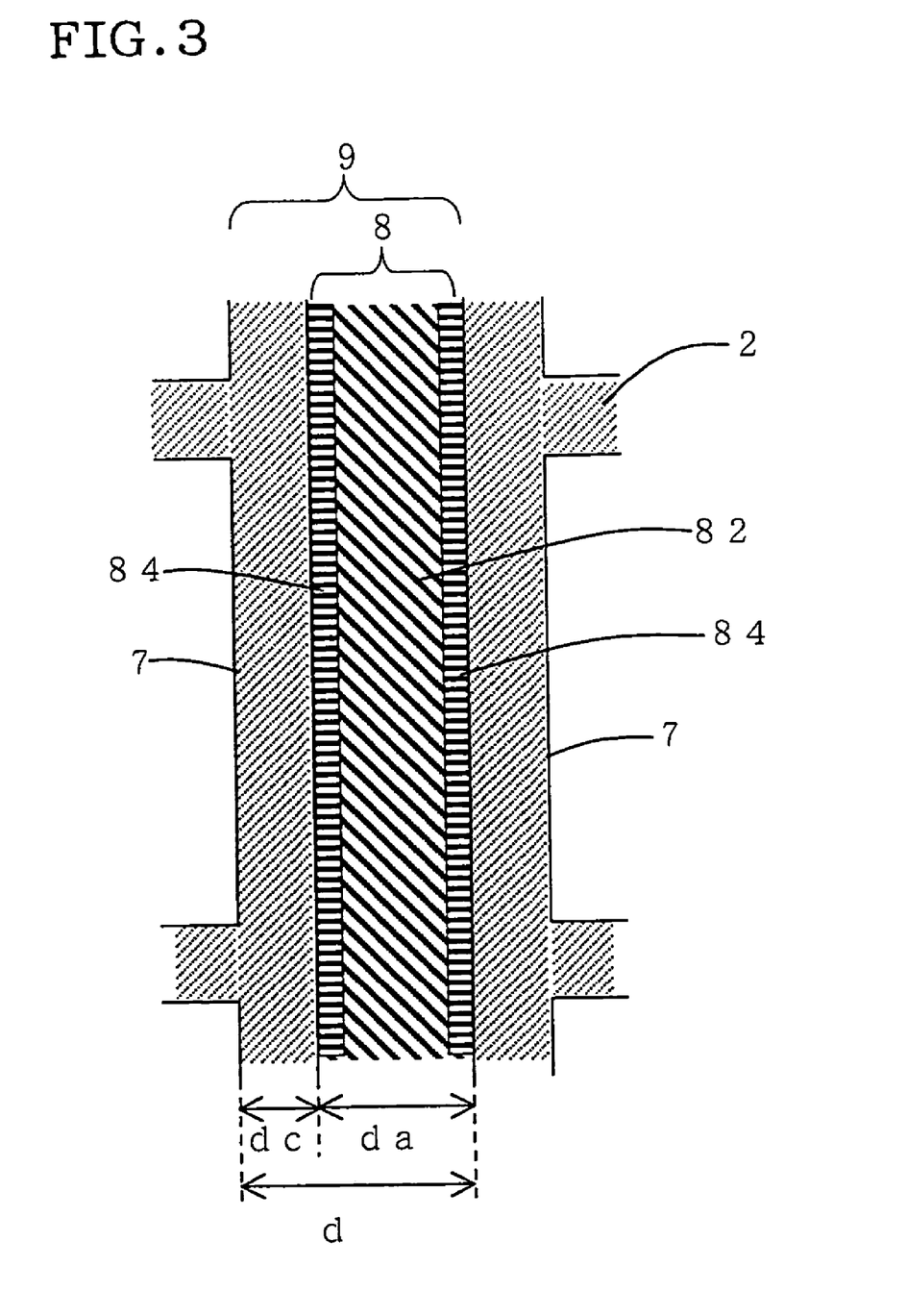
FIG. 3 is a schematic enlarged view of a portion corresponding to the portion II of FIG. 1(c), which shows another embodiment of the outer wall and bonding layer of the honeycomb structure of the present invention.

It is preferred that, as shown in FIG. 3, there is used a constitution in which the bonding layer 8 comprises an intermediate layer 84 contacting with an outer wall 7 and at least one adhesive layer 82. By employing such a constitution, the intermediate layer 84 can contain a particulate substance A having a particle diameter of the above-mentioned range and the adhesive layer 82 can have an appropriate bonding strength, the intermediate layer 84 can improve adhesivity between adhesive layer 82 and outer wall 7, and the thermal resistance at the interface can be decreased further.

In the honeycomb structure according to the first aspect of the present invention, an outer wall 7 is present at each side of a bonding layer 8, as shown in FIG. 3. Therefore, when an intermediate layer 84 is provided, the intermediate layer 84 is preferably present in the form of two layers at each side of the bonding layer 8. In this embodiment, it is necessary that each intermediate layer 84 is in contact with the outer wall 7, that is, is formed directly on the outer wall 7. However, the intermediate layer may be formed in the form of two or more layers between an adhesive layer and an outer wall. In this case, it is preferred that the intermediate layer formed directly on the outer wall has a composition containing a particulate substance A having a particle diameter of the above-mentioned range and showing good adhesivity with the outer wall, that the intermediate layer contacting with the adhesive layer has a composition showing good adhesivity with the adhesive layer, and that these compositions are changed gradually.

In another preferred embodiment for reducing the thermal resistance at interface, the bonding layer is constituted so as to comprise a layer formed from a raw material containing a liquid having a surface tension of 70 dyn/cm or less at 25° C. The bonding layer is formed generally by applying, to the surfaces to be bonded, a bonding agent of an easily deformable state such as slurry, solution or the like, bonding the resulting surfaces, and subjecting the surfaces to drying, heating or the like. In this case, by using a liquid of low surface tension as a component of the raw material for forming the bonding layer, generation of cracks at interface caused by the shrinkage during drying or heating can be prevented. Since cracks at interface increases the thermal resistance at interface, prevention of such cracks enables prevention of an increase in thermal resistance at interface. Too large a surface tension of the liquid gives rise to the above-mentioned problem, and too small a surface tension makes difficult the application of the bonding agent to the surfaces to be bonded. Therefore, the surface tension of the liquid is preferably 70 dyn/cm or less, more preferably 20 dyn/cm or more at 25° C.

As the liquid used in the bonding agent, a liquid of 70 dyn/cm to 20 dyn/cm may be selected. When the liquid contains water as a component, it is preferred that the surface tension of water (about 72 dyn/cm at 25° C.) is lowered. To do this, it is preferred that, for example, an organic liquid having a density close to that of water and a small surface tension is added to water and the liquid contains water and such an organic liquid. In this case, the organic liquid preferably has good miscibility with water, a surface tension smaller than that of water, for example, 40 to 70 dyn/cm and a density of 0.9 to 1.1 g/cm³ at 25° C. Further, the organic liquid preferably has affinity with water. As the organic liquid, there can specifically be mentioned, for example, acetic acid, ethyl benzoate, ethyl formate and dimethylformamide.

The bonding layer in the honeycomb structure of the first aspect, when it shows too large a thermal expansion coefficient, tends to generate cracks owing to the thermal shock, etc. Therefore, the bonding layer preferably has a relatively small thermal expansion coefficient. The thermal expansion coefficient of the bonding layer at 20 to 800° C. is preferably $1 \times 10^{-6} \sim 8 \times 10^{-6}$/° C., more preferably $1.5 \times 10^{-6} \sim 7 \times 10^{-6}$/° C., most preferably $2 \times 10^{-6} \sim 6 \times 10^{-6}$/° C. When the difference in thermal expansion coefficient between bonding layer and each honeycomb segment is too large, a thermal stress is concentrated at their interface when heated or cooled; therefore, such a difference in thermal expansion coefficient is not preferred. The difference in thermal expansion coefficient between the bonding layer and the honeycomb segment at 20 to 800° C. is preferably $1 \times 10^{-6}$/° C. or less.

The ratio of the thermal conductivity κs of honeycomb segment to the thermal conductivity κa of bonding layer, that is, the ratio κs/κa is preferably 5 to 300, more preferably 8 to 280, further preferably 10 to 250. When the ratio κs/κa is too small, the bonding layer does not contribute as a heat-insulating layer; therefore, heat is conducted to an adjacent honeycomb segment via the bonding layer and the temperature gradient within the honeycomb segment tends to be large. Meanwhile, when the ratio κs/κa is too large, the thermal conductivity of the bonding layer is too small relative to the honeycomb segment; therefore, the temperature gradient generating in the bonding layer is too large, cracks tends to generate in the bonding layer, and the breakage of honeycomb filter may occur.

Too large a thickness da of the bonding layer is not preferred because it hinders thermal conduction between honeycomb segments. Too small a thickness of the bonding layer is not preferred because no sufficient bonding strength is obtained. The thickness da of the bonding layer is preferably 0.01 to 0.5 cm.

The bonding layer is preferred to be composed mainly of a ceramic. The bonding layer is preferably formed by subjecting, to drying, heating, firing, etc., a raw material containing at least one kind of colloidal sol selected from silica sol, alumina sol, etc.; at least one kind of inorganic powder selected from a ceramic (selected from the group consisting of silicon carbide, silicon nitride, cordierite, alumina, mullite, zirconia, zirconium phosphate, aluminum titanate, titania and combinations thereof), a Fe—Cr—Al type metal, a nickel-based metal, metallic Si and SiC, etc.; at least one kind of inorganic fiber selected from ceramic fibers, etc.; an inorganic binder; and so forth. The colloidal sol is suitable in order to impart adhesivity; and the inorganic powder is suitable in order to increase the affinity with the outer wall of honeycomb segment, and there is preferred an inorganic powder having a thermal expansion coefficient close to that of the main component of honeycomb segment. The inorganic fiber is suitable as a reinforcing agent capable of appropriately imparting toughness to the bonding layer. When an adhesive layer and an intermediate layer are formed in the bonding layer, appropriate components are selected from the above-mentioned components, for use as the components of the adhesive layer and/or the intermediate layer.

In the first aspect of the present invention, various ceramics of oxide or non-oxide type, etc. are considered as the main components of honeycomb segment. As the main components, there is preferred, from the standpoints of strength, heat resistance, etc., at least one kind of material selected from the group consisting of cordierite, mullite, alumina, spinel, silicon carbide, silicon carbide-cordierite type composite material, silicon-silicon carbide type composite material, silicon nitride, lithium aluminum silicate, aluminum titanate, Fe—Cr—Al type metal and combinations thereof; from the standpoints of thermal conductivity and heat resistance, silicon carbide or a silicon-silicon carbide composite material is particularly suitable. The term "main component" means that it constitutes 50% by mass or more, preferably 70% by mass or more, more preferably 80% by mass or more of honeycomb segment. In the first aspect, when each honeycomb segment is composed mainly of a composite material of metallic silicon (Si) and silicon carbide (SiC) and when the Si content specified by Si/(Si+SiC) of honeycomb segment is too small, the effect of Si addition is hardly obtained; when the Si content is more than 50% by mass, the effect of heat resistance and high thermal conductivity (which is characteristic of SiC) is hardly obtained. Therefore, the Si content is preferably 5 to 50% by mass, more preferably 10 to 40% by mass.

In the first aspect of the present invention, the partition wall and outer wall of honeycomb segment are preferably a porous material capable of functioning as a filter and/or a catalyst carrier. There is no particular restriction as to the thicknesses of the partition wall and outer wall. However, too large a thickness of partition wall or outer wall results in too large a pressure loss when a fluid to be treated passes through the partition wall; too small a thickness of partition wall or outer wall results in an insufficient strength; therefore, such thicknesses are not preferred. The thickness of partition wall is preferably 30 to 2,000 μm, more preferably 40 to 1,000 μm, most preferably 50 to 500 μm. The thickness of outer wall is preferably 45 to 3,000 μm, more preferably 60 to 1,500 μm, most preferably 75 to 750 μm. Further, too small thermal conductivities of the partition wall and outer wall of honeycomb segment are not preferred because the heat within a honeycomb segment or between honeycomb segments is hindered. The thermal conductivities of partition wall and outer wall are preferably 10 to 60 W/mK, more preferably 15 to 55 W/mK, and most preferably 20 to 50 W/mK.

In the first aspect of the present invention, there is no particular restriction as to the cell density (number of through-holes per unit sectional area) of honeycomb segment. However, too small a cell density results in insufficiency in filter strength and effective GSA (geometrical surface area); too large a cell density result in a large pressure loss when a fluid to be treated flows. The cell density is preferably 6 to 2,000 cells/in.$^2$ (0.9 to 311 cells/cm$^2$), more preferably 50 to 1,000 cells/in.$^2$ (7.8 to 155 cells/cm$^2$), most preferably 100 to 400 cells/in.$^2$ (15.5 to 62.0 cells/cm$^2$). There is no particular restriction as to the sectional shape of through-holes (cell shape); however, the sectional shape is preferably any of a triangle, a tetragon, a hexagon and a corrugated shape the standpoint of honeycomb segment production.

In the first aspect of the present invention, there is no particular restriction as to the size of honeycomb segment. However, too large a segment size is not preferred because breakage occurs owing to a thermal stress. Too small a segment size is not preferred, either, because segment production and bonding of segments into one piece are complicated. A preferred size of segment is such that the sectional area is 900 to 10,000 mm$^2$, preferably 900 to 5,000 mm$^2$, most preferably 900 to 3,600 mm$^2$, and it is preferred that 70% by volume or more of the honeycomb structure is constituted by honeycomb segments of this size. There is no particular restriction as to the shape of honeycomb segment. However, its basic shape is, as shown in, for example, FIG.

1(a), a tetragon in sectional shape, that is, the honeycomb segment is a quadrangular prism; and the shapes of honeycomb segments at the periphery of honeycomb structure can be appropriately selected so as to match a shape of an integrated honeycomb structure, as shown in FIGS. 1(b) and 1(c).

As to the sectional shape of the honeycomb structure according to the first aspect of the present invention, there is no particular restriction. The sectional shape can be, for example, a circle as shown in FIG. 1(b), an ellipse, a race truck shape, an oval, a polygon (e.g. triangular, substantially triangular, tetragonal, or substantially tetragonal) or an irregular shape. There is no particular restriction as to the thermal conductivity of whole honeycomb structure, either. Too large a thermal conductivity is not preferred because the honeycomb structure of the present invention gives too large a heat release and no sufficient temperature increase is obtained during regeneration, resulting in low regeneration efficiency. Too small a thermal conductivity is not preferred, either, because heat release is too small and too large a temperature increase is obtained. The thermal conductivity at 40° C. is preferably 10 to 60 W/mK, more preferably 15 to 55 W/mK, most preferably 20 to 50 W/mK.

Figure 4A:
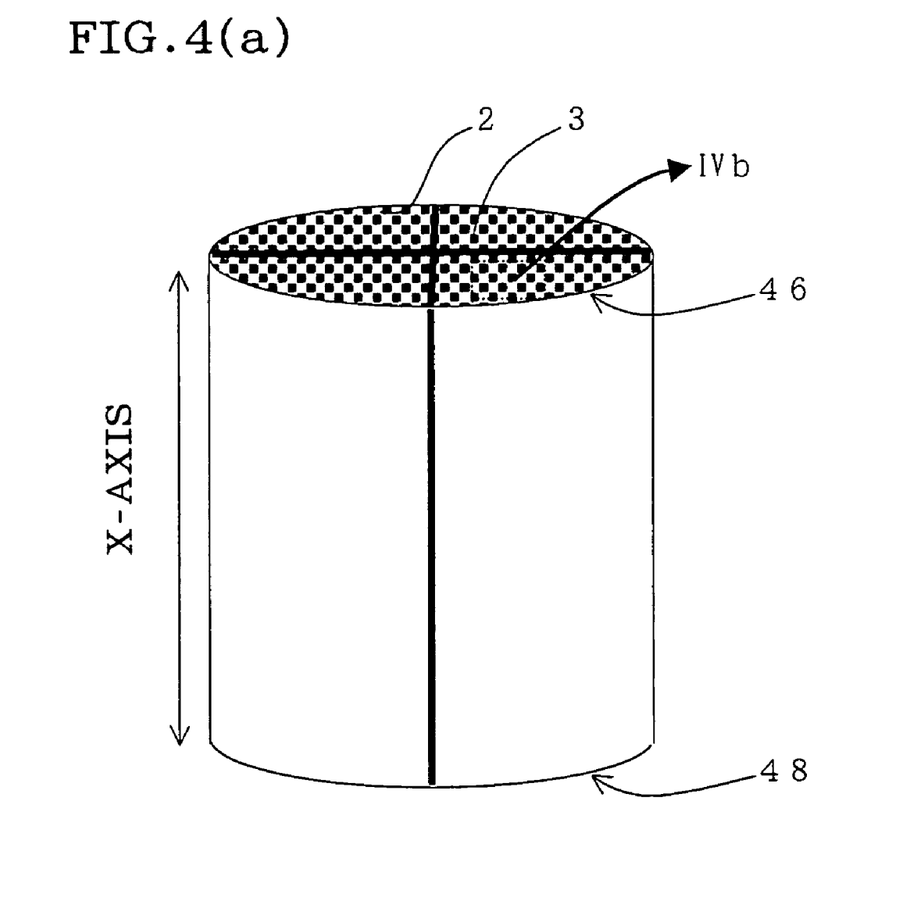
FIG. 4(a) is a schematic perspective view showing another embodiment of the honeycomb structure of the present invention.
Figure 4B:
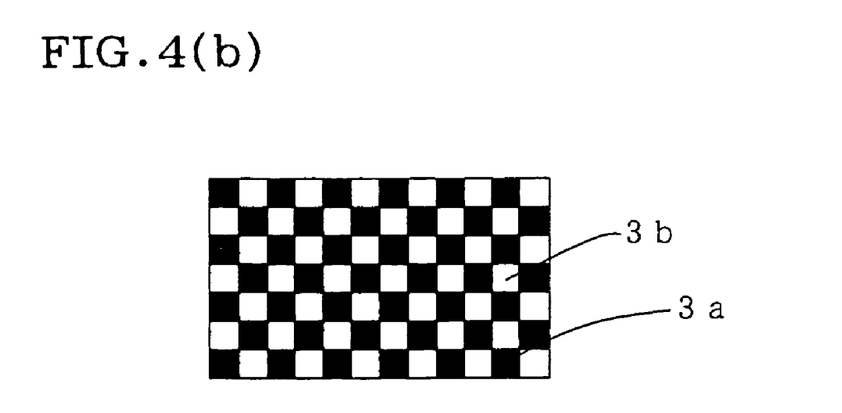
FIG. 4(b) is a schematic enlarged view of the portion IVb of FIG. 4(a).

In the honeycomb structure according to the first aspect of the present invention, when it is used particularly as a DPF, it is preferred that, as shown in FIGS. 4(a) and 4(b), predetermined through-holes 3a are plugged at of one end face 46 of the structure and the residual through-holes 3b are plugged at the other end face 48 of the structure. It is particularly preferred that, as shown in FIGS. 4(a) and 4(b), each two adjacent through-hole 3 are plugged at opposite side end each other (alternately plugged) so that each of the end faces 46 and 48 of the structure looks checkerboard pattern. By such plugging, a fluid to be treated entering the structure from, for example, one end face 46 passes through partition walls 2 and leaves from other end face 48; in this case, the partition walls 2 function as a filter and an intended substance can be removed.

As the material used for plugging, there can be suitably used at least one kind of material selected from the above-mentioned ceramics and metals suitably used in honeycomb segments.

When the honeycomb structure according to the first aspect of the present invention is used as a catalyst carrier for purification of an exhaust gas emitted from a heat engine such as internal combustion engine or the like or from a burner of a boiler or the like, or for reforming of a liquid fuel or a gaseous fuel, the honeycomb structure of the first aspect is preferably loaded with a catalyst, for example, a metal having a catalytic activity. As representative metals having a catalytic activity, Pt, Pd, Rh, etc. can be mentioned. Preferably, at least one kind of these metals is loaded on the honeycomb structure.

Next, description is made on the second aspect of the present invention, i.e. a process for production of honeycomb structure.

In the process for production of honeycomb structure, which is the second aspect of the present invention, first, a honeycomb segment is formed by a formation step. In the formation step, there is no particular restriction as to the method for formation of honeycomb segment. An ordinary method for producing a honeycomb material can be used. For example, the honeycomb segment can be formed by, for example the following step.

As the particulate substance S contained in the raw material for firing, there is used a particulate substance selected from at least one kind of ceramic (selected from the group consisting of silicon carbide, silicon nitride, cordierite, alumina, mullite, zirconia, zirconium phosphate, aluminum titanate, titania and combinations thereof), a Fe—Cr—Al type metal, a nickel type metal, metallic Si and SiC, and the like. Thereto are added a binder (e.g. methyl cellulose or hydroxypropoxylmethyl cellulose), a surfactant, water, etc. to produce a plastic puddle.

The plastic puddle is subjected to, for example, extrusion molding to form a honeycomb molded body having a large number of through-holes divided by partition walls and extending in the axial direction of the material.

The honeycomb molded body is dried by, for example, a microwave or hot air and then fired, whereby a honeycomb segment 12 such as shown in FIG. 1(a) can be formed. The honeycomb segment can be allowed to have a preferred shape mentioned in the above-mentioned first aspect of the present invention.

Next, by employing a step of applying a bonding agent for forming a bonding layer, on the outer wall of the honeycomb segment and a step of bonding a plurality of such segments into one piece, a honeycomb structure is formed.

The important characteristic of the second aspect of the present invention lies in that the bonding agent applied in the bonding step of forming a bonding layer contains a particulate substance A having an average particle diameter of $\frac{1}{100}$ to $\frac{1}{2}$, more preferably $\frac{1}{75}$ to $\frac{1}{3}$, most preferably $\frac{1}{50}$ to $\frac{1}{4}$ relative to the average particle diameter of the particulate substance S used in the formation step. By firing of a raw material for firing which contains a particulate substance S, open pores and unevenness appear on the surface of the outer wall of honeycomb segment. In this case, since the bonding agent contains a particulate substance A having an average particle diameter of the above-mentioned range, the particulate substance A enters the open pores or concave portions on the outer wall surface, the adhesivity between the bonding layer and the outer wall is improved owing to an anchor effect, and the thermal conductivity at their interface is improved.

As the particulate substance A, there is preferred at least one kind of inorganic powder selected from a ceramic (selected from the group consisting of silicon carbide, silicon nitride, cordierite, alumina, mullite, zirconia, zirconium phosphate, aluminum titanate, titania and combinations thereof), a Fe—Cr—Al type metal, a nickel type metal, metallic Si and SiC, and the like. More preferably, the particulate substance A is the same kind of material as the particulate substance S used in the formation step.

The bonding agent is preferred to further contain at least one kind of colloidal sol (e.g. silica sol or alumina sol), at least one kind of inorganic fiber (e.g. ceramic fiber), an inorganic binder, an organic binder, etc. Also preferably, the bonding agent contains a liquid component in addition to the above-mentioned solid components, for easy application. More preferably, the bonding agent is slurry of a liquid component and a solid component.

There is no particular restriction as to the method for applying the bonding agent on the outer wall. The application can be conducted by, for example, spraying, coating with a brush, a hair pencil or the like, or dipping.

In the second aspect of the present invention, one kind of bonding agent may be applied once but may be applied in plurality of times. Also, two or more kinds of bonding agents may be applied in two or more times. In this case, as shown in FIG. 3, it is preferred that the bonding step comprises a step of applying an intermediate layer agent in order to form at least one intermediate layer 84 on at least one of two outer walls 7 to be bonded with each other, preferably on both of them, and a step of applying an adhesive in order to form at least one adhesive layer 82. In this case, the intermediate layer agent to be applied directly on the outer wall is preferred to contain a particulate substance A having an average particle diameter of the above-mentioned range. By allowing the bonding step to comprise such steps, it is possible to allow the intermediate layer 84 formed on the outer wall 7, to have good adhesivity with the outer wall 7 and also allow the adhesive layer 82 to have good bonding strength. The thus-formed bonding layer 8 is constituted by a plurality of layers comprising at least one intermediate layer 84 and at least one adhesive layer 82, and the bonding agent comprises an intermediate layer agent and an adhesive.

Both the intermediate layer agent and the adhesive preferably contain a solid component and a liquid component. Further, they are each preferred to be slurry. The solid component of the intermediate layer agent or the adhesive preferably contains a component selected from those shown above as preferred components for bonding agent. There is no particular restriction as to the method for applying the intermediate layer agent or the adhesive. They can be applied by the same method as for the bonding agent.

The adhesive is preferably applied on the already applied intermediate layer agent. In this case, the intermediate layer agent is applied and subjected to drying, heating, firing, etc. and then the adhesive may be applied; or, after the application of the intermediate layer agent but with no drying, heating, firing or the like, the adhesive may be applied. Further, when the intermediate layer agent is applied only on one side wall 7, the adhesive may be applied directly on other side wall 7; in this case, there is no restriction as to the order of application of the intermediate layer agent and the adhesive.

After the bonding agent has been applied as above, individual segments are bonded into one piece to form a honeycomb structure. Then, depending upon the kind of the adhesive used, drying and/or firing is conducted further, whereby higher adhesivity can be obtained.

Next, description is made on the third aspect of the present invention, i.e. a process for production of honeycomb structure as the third aspect of the present invention.

In the process for production of honeycomb structure, which is the third aspect of the present invention, first, a honeycomb segment is formed. As in the second aspect of the present invention, there is no particular restriction as to the method for producing the honeycomb segment, and the honeycomb segment can be produced by the same step as employed in the second aspect of the present invention.

Next, the formed honeycomb segments are bonded by a bonding step to form a honeycomb structure. The bonding step comprises a step of applying an bonding agent in order to form at least one bonding layer on the outer wall 7 (of honeycomb segment) to be bonded, and a step of bonding the resulting honeycomb segments into one piece. The important characteristic of the third aspect of the present invention lies in that the bonding agent contains a liquid having a surface tension of 70 dyn/cm or less, preferably 20 dyn/cm or more at 25° C. The bonding agent generally contains a solid component and a liquid component and, by containing a liquid component having a surface tension of the above-mentioned range, can prevent formation of interface cracks which takes place by the shrinkage of bonding agent during drying or heating.

In the bonding step of the third aspect of the present invention, only one kind of bonding agent may be applied on the outer wall of honeycomb segment. However, it is also possible to apply an intermediate layer agent such as mentioned in the second aspect of the present invention and then apply an adhesive thereon. In this case, the above liquid may be contained in at least either of the intermediate layer agent and the adhesive, preferably in at least the adhesive. It is also preferred to produce a honeycomb structure by combining the second aspect of the present invention and the third aspect of the present invention.

The above-mentioned liquid having a surface tension of 70 dyn/cm or less, preferably 20 dyn/cm or more at 25° C. can be appropriately obtained by adding, for example, an organic liquid having a density close to that of water and a small surface tension, to water to obtain a liquid containing the organic liquid and water. The organic liquid is preferred to be well miscible with water, have a density of 0.9 to 1.1 g/cm$^3$ at 25° C. and a surface tension smaller than that of water, for example, 10 to 50 dyn/cm at 25° C., and have an affinity with water. As specific examples, there are mentioned dimethylformamide, acetic acid, ethyl benzoate and ethyl formate.

When the honeycomb structure produced according to the second and/or third aspect of the present invention is used in a filter, particularly in a DPF or the like, the open end faces of through-holes of honeycomb segment are preferably plugged alternately by a sealant and more preferably plugged so that each end face of honeycomb segment looks checkerboard pattern. Plugging by a sealant can be conducted by masking honeycomb segment through-holes that are not to be plugged, applying a slurry-state sealant to each open end face of honeycomb segment, and drying and firing the resulting honeycomb segment. In this case, the plugging is preferably conducted during the above-mentioned steps for honeycomb segment production, that is, after molding of honeycomb segment and before firing, because the firing step may be once. However, the plugging may be conducted after firing, or at any timing after molding. The material for sealant can be appropriately selected from the above-mentioned group of preferred raw materials for honeycomb segment, but is preferably the same raw material as used for honeycomb segment.

In the present invention, a catalyst may be loaded on the honeycomb structure. The loading may be conducted by a method ordinarily employed by those skilled in the art. The catalyst loading can be conducted, for example, by washcoating of catalyst slurry and subsequent drying and firing. This step as well may be conducted at any timing after molding of honeycomb segment.

Hereinafter, the present invention is specifically described by way of Examples. However, the present invention is in no way restricted by these Examples.

EXAMPLES AND COMPARATIVE EXAMPLES (Production of Honeycomb Segments)

As a raw material for firing, there were mixed a SiC powder (a particulate substance S) and a metallic Si powder in mass proportions shown in Table 1. Thereto were added methyl cellulose, hydroxypropoxylmethyl cellulose, a surfactant and water to produce a plastic puddle. This material was subjected to extrusion molding, followed by drying using a microwave and hot air, to obtain honeycomb molded bodies A and B each having a partition wall thickness of 380 μm, an outer wall thickness of 500 μm, a cell density of about 31.0 cells/cm$^2$ (200 cells/in.$^2$), a square section of 35 mm×35 mm, a length of 152 mm. The through-holes of each honeycomb segment were plugged with the same material as used in production of honeycomb segment so that each two adjacent through-holes were plugged at the opposite side end each other (plugged alternately) and each end face of honeycomb segment looked checkerboard pattern. Each resulting honeycomb segment was dried, degreased at about 400° C. in the air, then fired at about 1,450° C. in an Ar inert atmosphere to obtain honeycomb segments A and B of Si-bonded SiC.

TABLE 1

| Honeycomb segment | Average particle diameter of SiC (μm) | Amount of SiC used (mass %) | Average particle diameter of metallic Si (μm) | Amount of metallic Si used (mass %) | Average pore diameter (μm) | Porosity (%) | Four-point bending strength (MPa) | Young's modulus (GPa) | Thermal conductivity (W/mK) |
|---|---|---|---|---|---|---|---|---|---|
| A | 32.6 | 80 | 4 | 20 | 10 | 45 | 20 | 15 | 25 |
| B | 50   | 70 | 4 | 30 | 15 | 40 | 35 | 25 | 35 |

(Production of Adhesives)

Water and dimethylformamide were used as a liquid component according to a composition shown in Table 2. Clay as an inorganic binder was mixed into an aluminosilicate-based fiber having an average particle diameter of 100 μm, particulate silicon carbide having an average particle diameter of 10 μm, zirconium silicate and a 40 mass % aqueous silica sol solution. Thereto was added water of an amount shown in Table 2. Kneading was conducted for 30 minutes using a mixer to obtain adhesives A and B. The surface tensions of liquid components were measured by a capillary method.

TABLE 2

| Adhesive | Aluminosilicate fiber (mass %) | Silicon carbide (mass %) | Silica sol (mass %) | Clay (mass %) | Water (mass %) | Dimethyl-formamide (mass %) | Surface tension of liquid component (dyn/cm) | Thermal conductivity (W/mK) | Density (g/cm$^3$) |
|---|---|---|---|---|---|---|---|---|---|
| A | 32 | 37 | 20 | 1 | 8  | 2 | 60 | 0.3 | 1 |
| B | 32 | 37 | 20 | 1 | 10 | — | 72 | 0.9 | 1.7 |

(Production of Intermediate Layer Agents)

There were mixed particulate silicon carbide (a particulate substance A) having an average particle diameter shown in Table 3 and a 40 mass % aqueous silica sol solution. Thereto was added water to obtain slurry, whereby intermediate layer agents A to D were produced.

TABLE 3

| Intermediate layer agent | Silicon carbide (mass %) | Average particle diameter (μm) | Silica sol (mass %) | Water (mass %) |
|---|---|---|---|---|
| A | 37.5 | 3   | 25 | 37.5 |
| B | 37.5 | 11  | 25 | 37.5 |
| C | 37.5 | 0.2 | 25 | 37.5 |
| D | 37.5 | 20  | 25 | 37.5 |

EXAMPLES 1 TO 5 AND COMPARATIVE EXAMPLES 1 TO 4

An intermediate layer agent was coated on the outer wall of a honeycomb segment in a thickness of about 30 μm and then an adhesive was coated thereon, in a combination shown in Table 4. Then, honeycomb segments were bonded into one piece in a combination shown in Table 4, to produce honeycomb structures for DPF, of 144 mm (5.66 in.)×152 mm (6 in.). The interface between outer wall and bonding layer, of each honeycomb structure was observed using an optical microscope to examine the extent of cracks generation. The results are shown in Table 4. The thermal conductivities of the outer wall, bonding layer and circumferential layer of honeycomb segment were independently determined by a laser flash method; they were substituted into the formula (1) to determine an X value. The X value is shown in Table 4.

Each of the honeycomb structures obtained in Examples 1 to 5 and Comparative Examples 1 to 4 was installed to the exhaust line of a 3-liter direct injection diesel engine. The engine was operated using a diesel oil containing 30 ppm of a Ce fuel additive produced by Rhodia and a specified amount of soot was deposited on the honeycomb structure. Subsequently, the honeycomb structure was heated to 600° C. using a propane burner; the honeycomb structure inside was converted to a 18% oxygen concentration by the switch of a by-pass valve, to burn the soot deposited on the honeycomb structure to regenerate the honeycomb structure. The amount of soot deposited was increased by each 2 g/liter starting from 4 g/liter; and the deposited soot amount at which cracks were seen at the end face of honeycomb structure in microscope observation, was measured and taken as maximum soot amount. The results are shown in Table 4.

TABLE 4

| | Honeycomb segment | Adhesive | Intermediate layer agent | X value | Result of interface observation | Maximum soot amount (g/liter) |
|---|---|---|---|---|---|---|
| Example 1 | A | A | — | 0.9 | No crack | 10 |
| Example 2 | A | B | A | 0.85 | No crack | 12 |
| Example 3 | A | B | B | 0.7 | No crack | 12 |
| Example 4 | A | A | A | 0.98 | No crack | 12 |
| Example 5 | B | A | — | 0.95 | No crack | 12 |
| Comp. Example 1 | A | B | — | 0.5 | Partially cracked | 8 |
| Comp. Example 2 | A | B | C | 0.5 | Partially cracked | 8 |
| Comp. Example 3 | A | B | D | 0.3 | Wholly cracked | 6 |
| Comp. Example 4 | B | B | — | 0.55 | Partially cracked | 8 |

As shown in Table 4, the honeycomb structures of Examples 1 to 5 showed no crack at initial interface observation and indicated good adhesion between the outer wall and the bonding layer. Further, as compared with the honeycomb filters of Comparative Examples 1 to 4, the honeycomb filters of the present invention were large in maximum soot amount and apparently superior in durability.

INDUSTRIAL APPLICABILITY

As described above, in the honeycomb structure according to the first aspect of the present invention, since X of the formula (1) is 0.6 or more, adhesion at interface between outer wall and bonding layer was good and durability was good. Further, the honeycomb structure of the present invention could be produced favorably according to the second and/or third aspect. The honeycomb structure of the present invention can be used particularly suitably in a DPF. However, since the advantage of the present invention lies in that the excessive temperature increase of honeycomb structure can be prevented and the temperature distribution inside honeycomb structure can be uniformized, the application of the present honeycomb structure is not restricted to the DPF alone.

The invention claimed is:

1. A honeycomb structure formed by bonding a plurality of honeycomb segments into one piece, via a bonding layer, the honeycomb segment having an outer wall, partition walls provided inside the outer wall, and a large number of through-holes divided by the partition walls and extending in the axial direction of the segment, comprising the outer wall and the bonding layer having a relation of $$d*[(\kappa a/da)+(\kappa c/dc)] \geq \kappa \geq d*[(\kappa a/da)+(\kappa c/dc)] \times 0.6$$

wherein κc (W/mK) and dc (cm) are respectively the thermal conductivity and thickness of the outer wall, κa (W/mK) and da (cm) are respectively the thermal conductivity and thickness of the bonding layer formed on the outer wall, and κ (W/mK) and d (cm) are respectively the thermal conductivity and thickness of a layer which is the sum of the outer wall and the bonding layer;

wherein a ratio of the thermal conductivity κs of the honeycomb segment to the thermal conductivity κa of the bonding layer is 5 to 300; and wherein the outer wall is formed by firing of a raw material containing a particulate substance S, and the bonding layer contains a particulate substance A having an average particle diameter of 1/100 to 1/2 relative to the average particle diameter of the particulate substance S.

2. A honeycomb structure according to claim 1, wherein the bonding layer comprises a layer formed from a raw material containing a liquid having a surface tension of 70 dyn/cm or less at 25° C.

3. A honeycomb structure according to claim 2, wherein the liquid contained in the raw material of the bonding layer contains water and an organic liquid having, at 25° C., a density of 0.9 to 1.1 g/cm³ and a surface tension smaller than that of water.

4. A honeycomb structure according to claim 1, wherein the bonding layer contains a ceramic.

5. A honeycomb structure according to claim 1, wherein the honeycomb segment contains silicon carbide or a silicon-silicon carbide composite material as a major component.

6. A honeycomb structure according to claim 1, wherein predetermined through-holes of a honeycomb segment are plugged at one end face of the segment and the remaining through-holes of the segment are plugged at another end face of the segment.

7. A honeycomb structure according to claim 1, wherein at least 70% by volume of the structure is constituted by honeycomb segments having a sectional area of 900 to 10,000 mm².

8. A honeycomb structure according to claim 1, wherein a ratio of the thermal conductivity κs of the honeycomb segment to the thermal conductivity κa of the bonding layer is 10 to 250.

9. A process for producing a honeycomb structure set forth in claim 1, which comprises a formation step of forming a honeycomb segment having an outer wall, partition walls provided inside the outer wall, and a large number of through-holes divided by the partition walls and extending in the axial direction of the segment, and a bonding step of bonding the honeycomb segments to produce the honeycomb structure, wherein the formation step comprises a firing step of firing a raw material containing a particulate substance S, the bonding step comprises a step of applying a bonding agent to form a bonding layer, on the outer wall and a step of bonding the resulting honeycomb segments into one piece, and the bonding agent contains a particulate substance A having an average particle diameter of 1/100 to 1/2 relative to the average particle diameter of the particulate substance S in the raw material for firing.

10. A process for producing a honeycomb structure according to claim 9, wherein the step of applying a bonding agent to form a bonding layer comprises a step of applying, on the outer wall of the honeycomb segment, an intermediate layer agent to form at least one intermediate layer and a step of applying an adhesive to form at least one adhesive layer.

11. A process for producing a honeycomb structure set forth in claim 1, which comprises a formation step of forming a honeycomb segment having an outer wall, partition walls provided inside the outer wall, and a large number of through-holes divided by the partition walls and extending in the axial direction of the segment, and a bonding step of bonding the honeycomb segments to produce a honeycomb structure, wherein the bonding step comprises a step of applying a bonding agent to form at least one bonding layer, on the outer wall and a step of bonding the resulting honeycomb segments into one piece, and the bonding agent contains a liquid having a surface tension of 70 dyn/cm or less at 25° C.

12. A process for producing a honeycomb structure according to claim 11, wherein the liquid having a surface tension of 70 dyn/cm or less at 25° C. contains water and an organic liquid having, at 25° C., a density of 0.9 to 1.1 g/cm$^3$ and a surface tension smaller than that of water.

13. A honeycomb structure formed by bonding a plurality of honeycomb segments into one piece, via a bonding layer, the honeycomb segment having an outer wall, partition walls provided inside the outer wall, and a large number of through-holes divided by the partition walls and extending in the axial direction of the segment, comprising the outer wall and the bonding layer having a relation of $$d*[(\kappa a/da)+(\kappa c/dc)] \geq \kappa \geq d*[(\kappa a/da)+(\kappa c/dc)] \times 0.6$$

wherein κc (W/mK) and dc (cm) are respectively the thermal conductivity and thickness of the outer wall, κa (W/mK) and da (cm) are respectively the thermal conductivity and thickness of the bonding layer formed on the outer wall, and κ (W/mK) and d (cm) are respectively the thermal conductivity and thickness of a layer which is the sum of the outer wall and the bonding layer;

wherein the outer wall is formed by firing of a raw material containing a particulate substance S, and the bonding layer contains a particulate substance A having an average particle diameter of 1/100 to 1/2 relative to the average particle diameter of the particulate substance S, and wherein the bonding layer comprises an intermediate layer containing a particulate substance A having an average particle diameter of 1/100 to 1/2 relative to the average particle diameter of the particulate substance S and formed directly on the outer wall, and an adhesive layer.

14. A honeycomb structure according to claim 13, wherein the bonding layer comprises a layer formed from a raw material containing a liquid having a surface tension of 70 dyn/cm or less at 25° C.

15. A honeycomb structure according to claim 14, wherein the liquid contained in the raw material of the bonding layer contains water and an organic liquid having, at 25° C., a density of 0.9 to 1.1 g/cm$^3$ and a surface tension smaller than that of water.

16. A honeycomb structure according to claim 15, wherein the bonding layer contains a ceramic.

17. A honeycomb structure according to claim 16, wherein the honeycomb segment contains silicon carbide or a silicon-silicon carbide composite material as a major component.

18. A honeycomb structure according to claim 17, wherein predetermined through-holes of a honeycomb segment are plugged at one end face of the segment and the remaining through-holes of the segment are plugged at another end face of the segment.

19. A honeycomb structure according to claim 6, wherein at least 70% by volume of the structure is constituted by honeycomb segments having a sectional area of 900 to 10,000 mm$^2$.

* * * * *